United States Patent
De los Rios Leiva et al.

(10) Patent No.: US 9,903,150 B2
(45) Date of Patent: Feb. 27, 2018

(54) CURVED CROSS-SECTION WIND TURBINE TOWER AND WIND TURBINE COMPRISING SAID TOWER

(71) Applicant: Acciona Windpower, S.A., Sarriguren, Navarra (ES)

(72) Inventors: Gonzalo De los Rios Leiva, Navarra (ES); Jose Luis Aristegui Lantero, Navarra (ES); Teresa Arlaban Gabeiras, Navarra (ES); Jose Miguel Garcia Sayes, Navarra (ES); Miguel Nunez Polo, Navarra (ES)

(73) Assignee: Acciona Windpower, S.A. (ES)

( * ) Notice: Subject to any disclaimer, the term of this patent is extended or adjusted under 35 U.S.C. 154(b) by 0 days.

(21) Appl. No.: 15/385,406

(22) Filed: Dec. 20, 2016

(65) Prior Publication Data

US 2017/0175434 A1   Jun. 22, 2017

(30) Foreign Application Priority Data

Dec. 22, 2015 (EP) .................................... 15382655

(51) Int. Cl.
| | |
|---|---|
| *E04C 3/00* | (2006.01) |
| *E06B 1/52* | (2006.01) |
| *F03D 13/20* | (2016.01) |
| *E04H 12/00* | (2006.01) |
| *E06B 1/12* | (2006.01) |

(Continued)

(52) U.S. Cl.
CPC .............. *E06B 1/52* (2013.01); *E04H 12/003* (2013.01); *E06B 1/12* (2013.01); *F03D 13/20* (2016.05); *E04H 12/00* (2013.01); *E04H 12/08* (2013.01); *E04H 12/26* (2013.01);
(Continued)

(58) Field of Classification Search
CPC ......... E04H 12/00; E04H 12/08; E04H 12/26; E04H 12/003; E04H 2012/006; F03D 13/00; F03D 13/10; F03D 80/00; Y02E 10/72; Y02E 10/728
USPC .... 52/831, 849, 843, 651.05, 223.4, 745.17; 264/32
See application file for complete search history.

(56) References Cited

U.S. PATENT DOCUMENTS

| | | | |
|---|---|---|---|
| 8,109,061 B2 * | 2/2012 | Kristensen | ............ E04H 12/003 52/40 |
| 8,171,674 B2 * | 5/2012 | Bagepalli | .............. E04H 12/003 52/40 |

(Continued)

FOREIGN PATENT DOCUMENTS

| | | |
|---|---|---|
| CN | 201786578 U | 4/2011 |
| CN | 104405597 A | 3/2015 |

(Continued)

*Primary Examiner* — Chi Q Nguyen
(74) *Attorney, Agent, or Firm* — Hayes Soloway PC

(57) ABSTRACT

A wind turbine tower wall having an orifice for accessing the interior of the tower, and an outer surface defined by generatrices; and a reinforcement frame joined to the tower in the orifice zone, and comprising least two parts joined one to each other. Each part has a mid-plane that is parallel to at least one generatrix, the mid-planes of at least one pair of adjacent parts forming an angle other than 180° therebetween. It enables the obtention of a frame more conformed to the curvature of the tower, combining savings in the material of said frame, greater optimization of the resistance of the tower and reduced stress concentration.

18 Claims, 7 Drawing Sheets

(51) Int. Cl.
  *E04H 12/08*   (2006.01)
  *E04H 12/26*   (2006.01)
  *F03D 80/00*   (2016.01)
  *F03D 13/00*   (2016.01)
  *F03D 13/10*   (2016.01)

(52) U.S. Cl.
  CPC ........ *E04H 2012/006* (2013.01); *F03D 13/00* (2016.05); *F03D 13/10* (2016.05); *F03D 80/00* (2016.05)

(56) References Cited

U.S. PATENT DOCUMENTS

| | | | |
|---|---|---|---|
| 9,279,266 B2* | 3/2016 | Unanua Hermoso De Mendoza | F03D 13/20 |
| 2006/0225379 A1* | 10/2006 | Seidel | F03D 13/20 52/848 |
| 2008/0034675 A1* | 2/2008 | Kristensen | E04H 12/003 52/40 |
| 2010/0313497 A1* | 12/2010 | Jensen | E04H 12/08 52/173.1 |
| 2011/0067322 A1 | 3/2011 | Taschek | |

FOREIGN PATENT DOCUMENTS

| | | |
|---|---|---|
| DE | 102012019595 B3 | 11/2013 |
| DE | 102013016604 A1 | 4/2015 |
| GB | 599929 | 3/1948 |
| WO | 2015169968 A1 | 11/2015 |

* cited by examiner

CURVED CROSS-SECTION WIND TURBINE TOWER AND WIND TURBINE COMPRISING SAID TOWER

OBJECT OF THE INVENTION

The present invention can be included in the sector of the art relating to construction, particularly tower construction.

More specifically, the object of the invention relates, in accordance with a first aspect, to a curved cross-section tower, destined for use in wind turbines. In accordance with a second aspect, the invention relates to a wind turbine comprising the tower referred to in the first aspect.

BACKGROUND OF THE INVENTION

The inclusion of an access door at the base of a metallic wind turbine tower entails a reduction in the cross-section of the tower wall that weakens said tower base. This effect is even more critical due to the fact that it is in the tower base where the loads are highest. Additionally, the access orifice wherein the door is installed causes a discontinuity in the tower that gives rise to the appearance of a stress concentration zone.

In order to mitigate the aforementioned adverse effects, the tower is usually reinforced in the door zone by a frame which is generally welded to the tower around the orifice.

In certain cases, the frame is obtained by cutting a plate, for example rectangular, having a thickness substantially greater than the thickness of the tower wall, as can be observed in FIGS. 1a and 1b. In said figures, an orifice (1) can be observed at the base (2) of a hollow metallic wind turbine tower, wherein a flat frame (3) is installed in the orifice (1), as described previously.

In order for the frame to be securely joined to the tower, the thickness of the tower wall in the orifice zone must be fully contained in the thickness of the frame along the entire perimeter of the orifice.

In embodiments of the state of the art, the frame is obtained by cutting a single flat piece. When the tower cross-section is curved, in order to securely join it to the tower and to ensure that the desired resistance is obtained, the thickness of the frame is greater than would be necessary if the frame had a curvature to conform to the curvature of the tower. Consequently, the frames are heavier and more expensive.

German patent DE102012019595 (e.n.o. Energy Systems) discloses a reinforcement frame for an opening located at the base of a wind turbine tower, wherein the frame is formed by two portions of laminated or forged steel, welded to the upper and lower part. The frame additionally comprises a welding lip for joining to the tower. The joint between the two parts that make up the frame is executed on the same plane, therefore the frame does not conform to the curvature of the tower. Consequently and as can be observed in the figures, the thickness of the frame is oversized.

Likewise, Chinese utility model CN201786578U (Shanghai Thaisheng Power Engineering Machinery) relates to a door frame, for a tower, said frame being formed from a plurality of parts joined therebetween, wherein at least an upper and lower part have a curvature in two directions to better conform to the curvature of the tower. Curving these parts in two directions is complex and expensive. In addition, this double curvature complicates the joint with the straight parts that form the frame, since the cross-sections of the two parts must coincide.

SUMMARY OF THE INVENTION

The present invention describes, in accordance with a first aspect, a curved cross-section tower, destined for forming part of a wind turbine. In accordance with a second aspect, the invention relates to a wind turbine comprising the aforementioned tower.

The tower comprises a wall, wherein a corresponding orifice is defined, for accessing the interior of the tower, and wherein the wall has an outer surface which is defined by generatrices. The tower additionally includes a reinforcement frame joined to the tower in the orifice zone, wherein the frame is formed from at least two parts joined therebetween.

The tower of the invention is characterised in that each of the frame parts has a mid-plane which is parallel to at least one generatrix of the tower, and in that the mid-planes of at least two adjacent parts form an angle other than 180° therebetween.

Therefore, the metallic tower described resolves a drawback arising from the combination of the curvature of the tower and the need to enable sufficient space to execute the joint between the frame and the tower. Also, stress concentration is reduced, as the joint between the frame and the tower is more centred on the thickness of the frame than on embodiments having flat frames.

The configuration described makes it possible to reduce the thickness of the parts that make up the frame and, therefore, their cost, without compromising the resistance of the tower in its entirety.

BRIEF DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

DETAILED DESCRIPTION OF THE DRAWINGS

Following is a detailed description of the present invention, with the help of the aforementioned attached FIGS. 1 to 9, in addition to two preferred embodiments thereof.

Figure 1A:
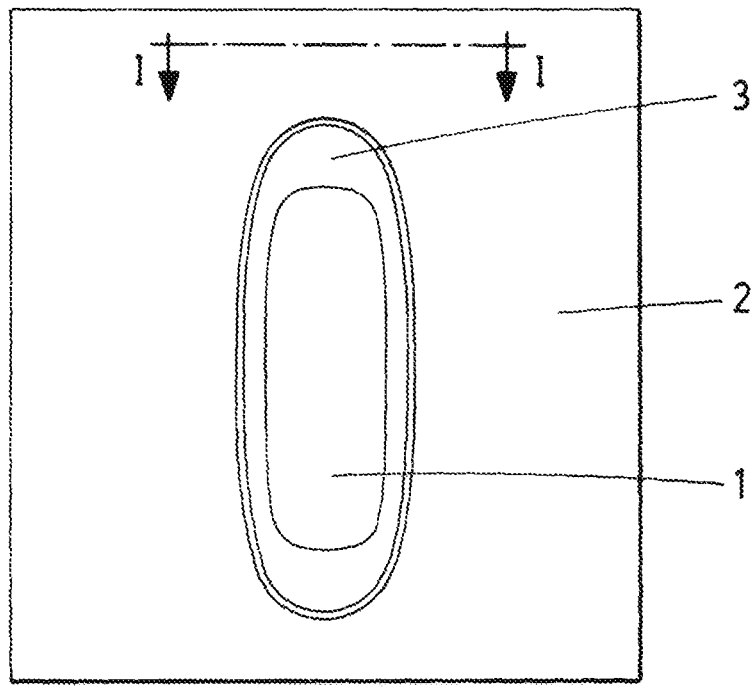
FIGS. 1A and 1B show respective schematic elevational (FIG. 1A) and plan (FIG. 1B) views of an embodiment of a metallic wind turbine tower having an orifice and a corresponding reinforcement frame, in accordance with the state of the art.
Figure 1B:
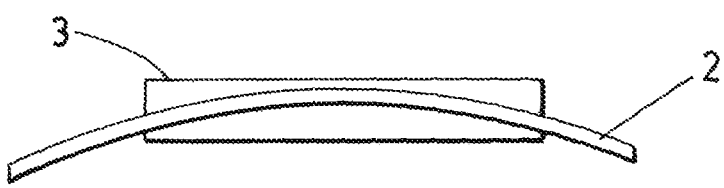
Figure 2:
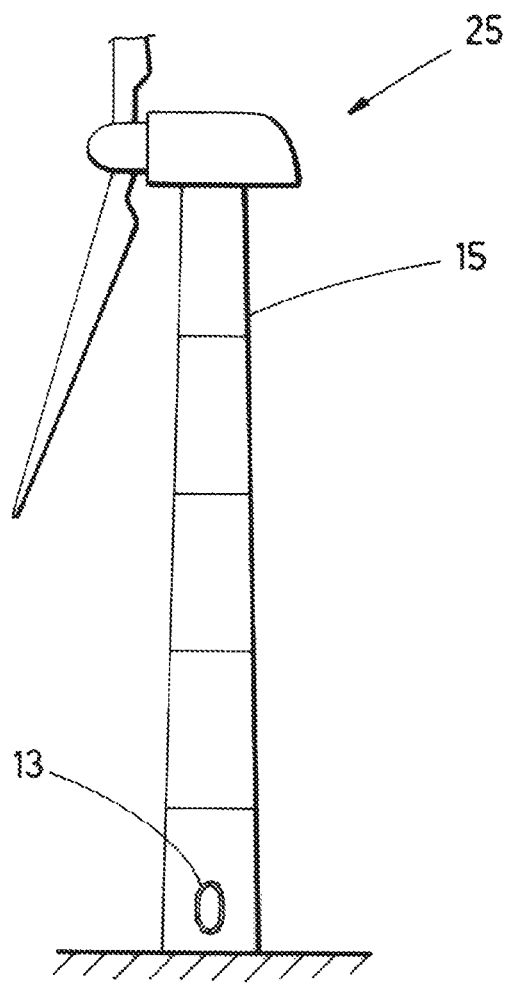
FIG. 2 shows a wind turbine comprising a tower in accordance with the invention described.
Figure 3A:
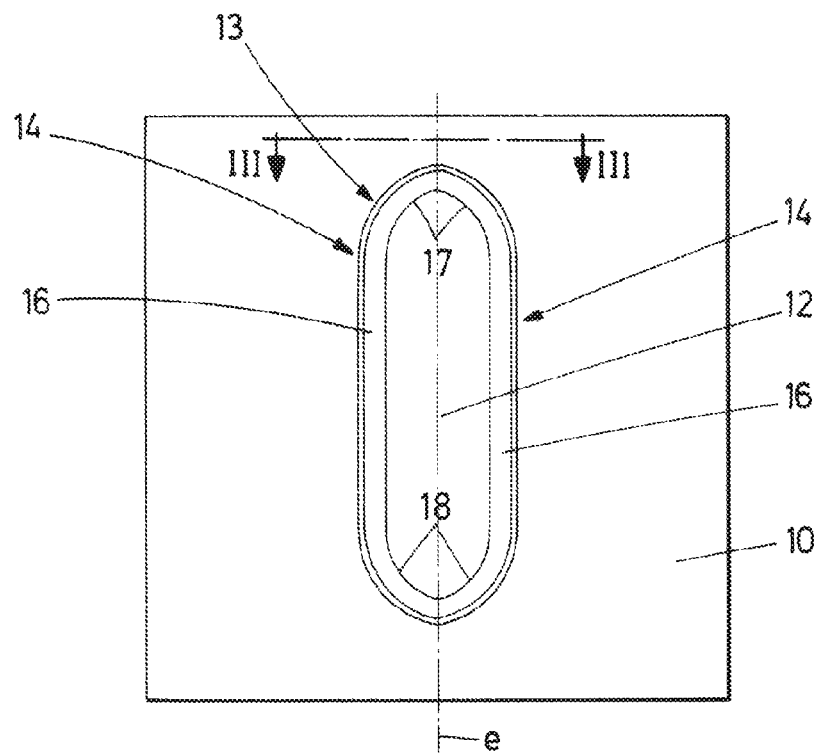
FIGS. 3A and 3B show respective schematic elevational (FIG. 3A) and plan (FIG. 3B) views of an embodiment of a tower in accordance with an example of the present invention.
Figure 3B:
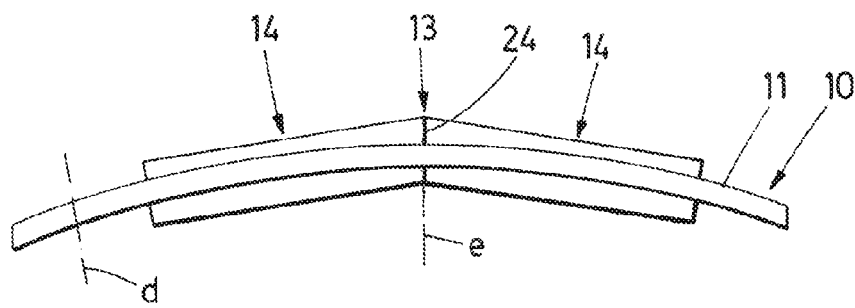

The present invention relates, as can be observed in FIGS. 3A and 3B, to a curved cross-section tower (15) for a wind turbine (25), see FIG. 2, wherein the tower (15) is formed by a plurality of sections (10) having a curved cross-section, said sections (10) preferably being truncated cone-shaped with a circular cross-section and, therefore, having an outer surface defined, at least partially, by means of generatrices. Without loss of generality, the sections (10) may adopt any other shape defined by generatrices, for example, cylindrical.

Each of the sections (10) comprise their corresponding outer wall (11). An orifice (12) for accessing the interior of said tower (15) is included in the wall (11) of one of the sections (10), specifically a lower section (10) that constitutes the base of the tower (15), and a reinforcing frame (13) is additionally incorporated, mounted on the perimeter of the orifice (12).

The perimeter comprises, in turn, two longitudinal zones oriented along the direction of corresponding generatrices of the tower (15), wherein the aforementioned longitudinal zones are located one on the right side and the other on the left side of the orifice. Additionally, the perimeter comprises two transverse zones, i.e. an upper and a lower zone, for connecting the two longitudinal zones therebetween. The transverse zones are affected by the curvature of the tower (15), while the longitudinal zones, due to their orientation along generatrices, are not affected by said curvature.

The frame (13) comprises a plurality of parts (14), preferably metallic, endowed with corresponding thicknesses, and which are joined together at least in the transverse zones adjacently along the perimeter of the orifice (12), such that the thickness of the wall of the section (10) in the orifice (12) zone is fully contained in the thickness of each of the parts (14).

In accordance with the present invention, each of the parts (14) has a mid-plane (20) which is parallel to at least one generatrix of the tower (15), as well as the mid-planes (20) of at least two adjacent parts (14) which are joined together form an angle other than 180° therebetween to adapt to the curvature of the wall (11) of the tower (15) in the transverse zones of the orifice (12), as shown, for example, in FIGS. 3A and 3B. The mid-plane (20) of each part (14) occupies a central position with respect to the thickness of its corresponding part (14).

In order to join the parts (14) therebetween and/or to the tower (15) wall (11), it is preferable to use welding, preferably butt welding, due to being a particularly effective and maintenance-free procedure.

Likewise, in order to facilitate the joint between the parts (14), at least one of the parts (14) has a joining surface (24) on one end for being joined to an adjacent part (14), said joining surface (24) being inclined with respect to the mid-plane (20), i.e. forming an angle other than 90° with said mid-plane (20).

Furthermore, it is also preferable for at least one of the parts (14) to have at least one curved section, wherein said part (14) can even be completely curved. In particular, it is preferable to obtain the curved part (14) by curving a prismatic, generally straight, element, and which preferably has a hollow cross-section. The curved shape of the part (14) can alternatively be obtained by cutting a flat element, such as a flat plate.

As will be explained later and in greater detail, the position of the mid-planes (20) of the parts (14) with respect to the mid-surface of a wall (11) of the tower (15) can have different effects.

In particular, the mid-plane (20) of at least one of the parts (14) can be secant to the mid-surface (21) of the tower (15) wall (11). "mid-surface (21)" is understood to be the surface which, congruently to that of the tower (15) wall (11), i.e. in this case in a truncated cone-shaped manner, equally divides the tower (15) wall (11) with respect to the thickness. Likewise, the mid-planes (20) of a pair of adjacent parts (14) can define a first intersection (A) therebetween which is tangential to the mid-surface (21) of the wall (11) of the tower (15). Additionally, each part (14) can also comprise a lateral surface (22), whereby the part (14) is joined to the wall (11) of the tower (15), wherein the mid-plane (20) of a part (14) defines, with its lateral surface (22), a second intersection (B) tangential to the mid-surface (21) of the wall (11) of the tower (15).

Alternatively, the mid-plane (20) of at least one of the parts (14) can be tangential to the aforementioned mid-surface (21). The mid-plane (20) of at least one of the parts (14) may also be displaced with respect to the mid-surface (21), outwards in a radial direction, in order not to intersect with said mid-surface (21).

Following is a description of a first, more preferred, embodiment with the help of FIGS. 3A, 3B and 4 to 7, wherein the parts (14) consist of two parts (14), which in turn comprise a middle section (16), in addition to an upper (17) and lower section (18) which respectively extend, above and below, from the middle section (16), towards the corresponding upper section (17) or lower (18) section of the other part (14), to be assembled. The two parts (14) are shown in FIGS. 3A and 3B one on either side, right and left. In the example shown, the middle sections (16) are straight and are mounted on the longitudinal zone of the perimeter of the orifice (12); likewise, the upper (17) and lower (18) sections extend from the middle section (16) towards the corresponding upper (17) and lower (18) section of the other part (14), to be assembled in the transverse zone. In this way, the frame (13) can be conformed to the curvature of the tower (15) using only two parts (14).

As can be observed in the example shown, the two parts (14) are preferably symmetrical to one another with respect to a central plane (e) of the orifice (12), which is oriented along a generatrix. Preferably, the upper (17) and lower (18) sections of the parts (14) are endowed with a curved shape to conform to the perimeter of a curved orifice which makes it possible to reduce stress concentration at the base of the tower (15).

Figure 4:
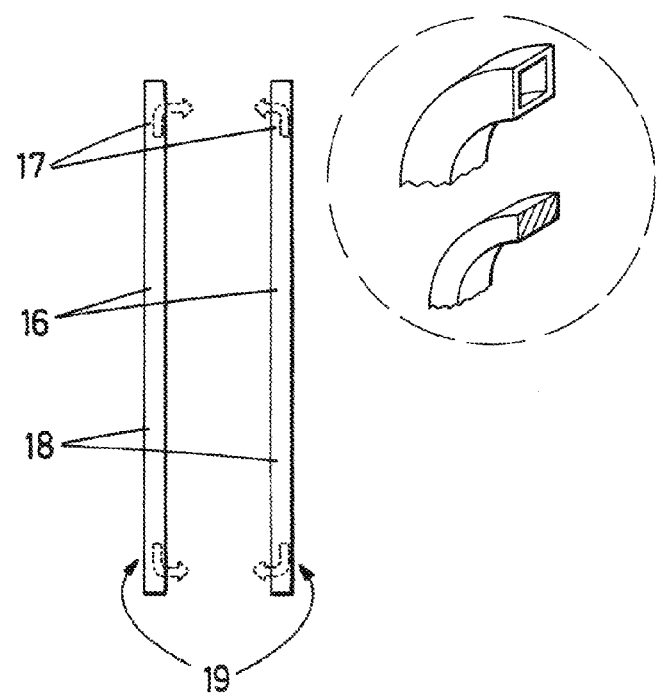
FIG. 4 shows an example of two parts of the frame formed from initial parts which are longitudinal profiles.

As shown in FIG. 4, in accordance with a more preferred embodiment, the parts (14) and, more specifically, the curved shape of the upper (17) and lower (18) sections, are configured by means of curving and/or bending as of initial parts (19), preferably straight, more preferably longitudinal profiles.

Alternatively, the parts (14) can be obtained from a flat plate by cutting. This avoids the bending of longitudinal profiles which, in high-inertia profiles such as those proposed by the invention, can be very difficult.

On the contrary, the previously described bending of the initial longitudinal parts (19) has the advantage of optimising the material, as well as allowing the obtainment of frames (13) with structurally more appropriate geometries (for example, double T-shaped beams, hollow cross-sections, etc.).

Figure 8A:
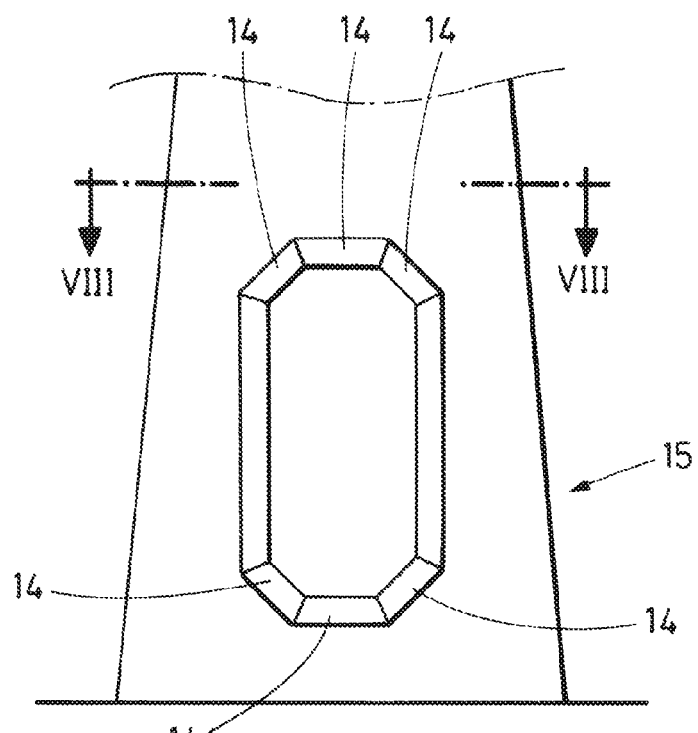
FIGS. 8A and 8B show elevational and plan views (section along plane VIII-VIII) of an embodiment of the tower of the invention wherein the frame comprises more than two assembled longitudinal parts.
Figure 8B:
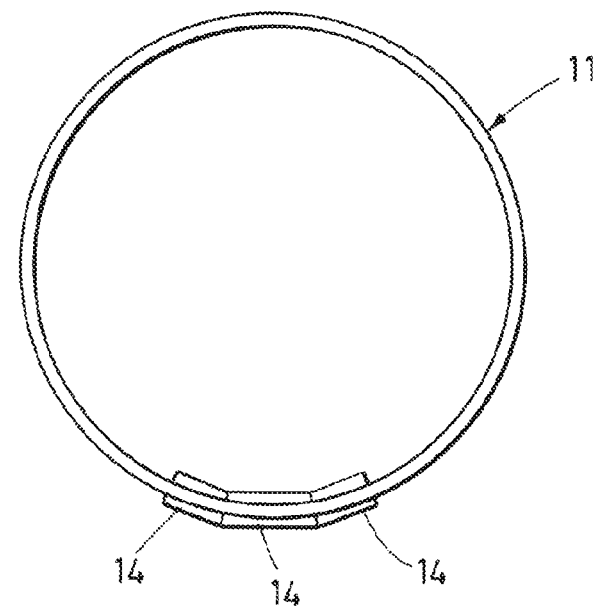

In accordance with a second preferred embodiment, shown in FIGS. 8A and 8B, each of the parts (14) that make up the frame (13) are straight elements, thereby avoiding the curving of the parts (14) or the wastage of material associated with the cutting of curved elements from flat plates. In this case it is convenient for the frame (13) to be formed from a larger number of parts (14) joined therebetween, such that the mid-planes (20) of the adjacent parts (14) form an angle other than 180° therebetween, than in the case of a frame (13) formed from curved parts (14).

It is preferable for the initial, longitudinal, parts (19) to have a uniform cross-section (for the sake of simplicity, so as to allow the use of commercial profiles), whether open or closed. Also, in the case of closed cross-sections, these may be hollow or solid. Thus, for example, the initial parts (19) may be profiles with a rectangular/square or circular hollow cross-section. In the case of rectangular or square cross-sections, the joint between the frame (13) and the tower (15) is facilitated on having flat surfaces disposed in opposition to the tower (15) wall (11) in the joint zone.

Since the invention is aimed mainly at optimising, from the viewpoint of resistance of the tower (15) and use of material, the joint between a frame (13) formed from flat parts (14) or parts (14) with a curvature contained on a plane in a curved orifice (12), different criteria can be taken into account, in general related to the distribution of stresses, to determine the position of the parts (14) with respect to each other and with respect to the tower (15). Some positioning criteria of the parts (14) are explained below with the help of FIGS. 5 to 7.

Figure 5:
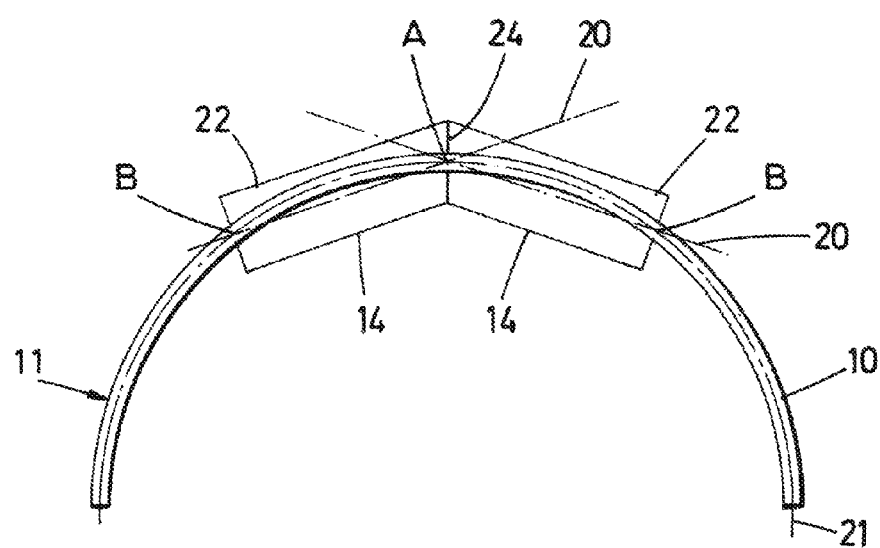
FIG. 5 shows a preferred embodiment of the invention, wherein the intersection between the mid-planes corresponding to two adjacent parts of the frame is tangential to the mid-surface of the tower wall and also that the intersection of the mid-plane of a part with a lateral surface of said part is tangential to the mid-surface of the tower wall.

In accordance with a first positioning criterion, the mid-plane (20) of at least one of the parts (14) is secant to the mid-surface (21) of the wall (11) of the tower (15). In this manner, the resistance of the joint between the frame (13) and the tower (15) is uniform throughout the frame (13)-tower (15) joint, as greater frame (13)-tower (15) joint symmetry is obtained along the entire perimeter of the orifice (12). Additionally, according to said first positioning criterion, as shown in FIG. 5, a first intersection (A) between the mid-planes (20) corresponding to two adjacent parts (14) is preferably tangential to the mid-surface of the wall (11). This ensures that the joint between the frame (13) and the tower (15) is more resistant in the zone wherein the two adjacent parts (14) are joined together, as greater frame (13)-tower (15) joint symmetry is obtained in the joining zone between the parts (14).

In accordance with said first criterion, a second intersection (B) of the mid-plane (20) of a part (14) with a lateral surface (22) of said part (14) whereby it is joined to the wall (11) of the tower (15), is preferably tangential to the mid-surface (21) of the tower (15) wall (11). That is, in a plan view, the second intersection (B) is included within a median line that represents the mid-surface (21). In this manner, the frame (13)-tower (15) joint is reinforced in the central zone (16) of each part (14), wherefrom the upper (17) and lower (18) sections extend.

Figure 6:
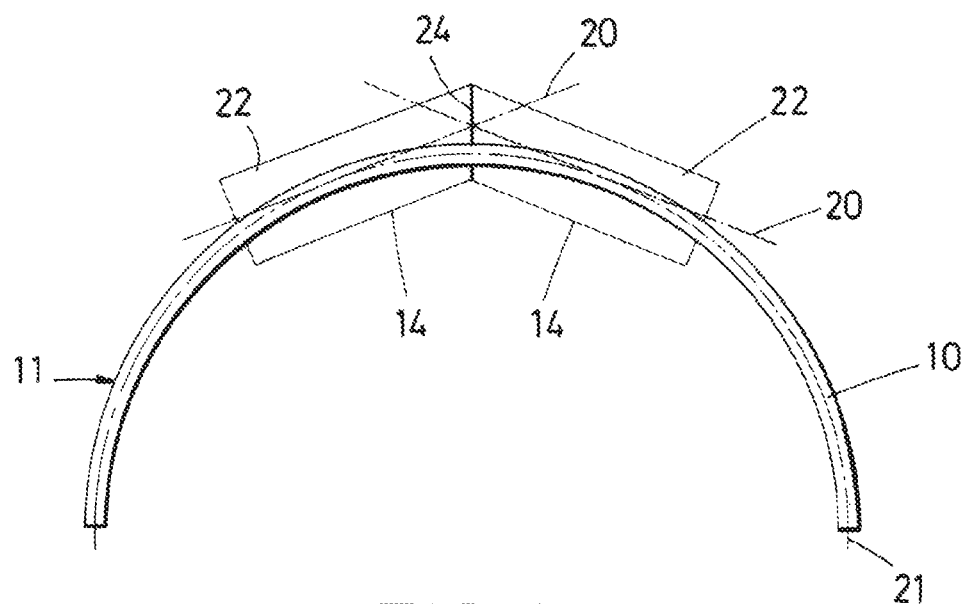
FIG. 6 shows a preferred embodiment of the invention, wherein the mid-plane of one of the parts of the frame is tangential to the mid-surface of the wall.
Figure 7:
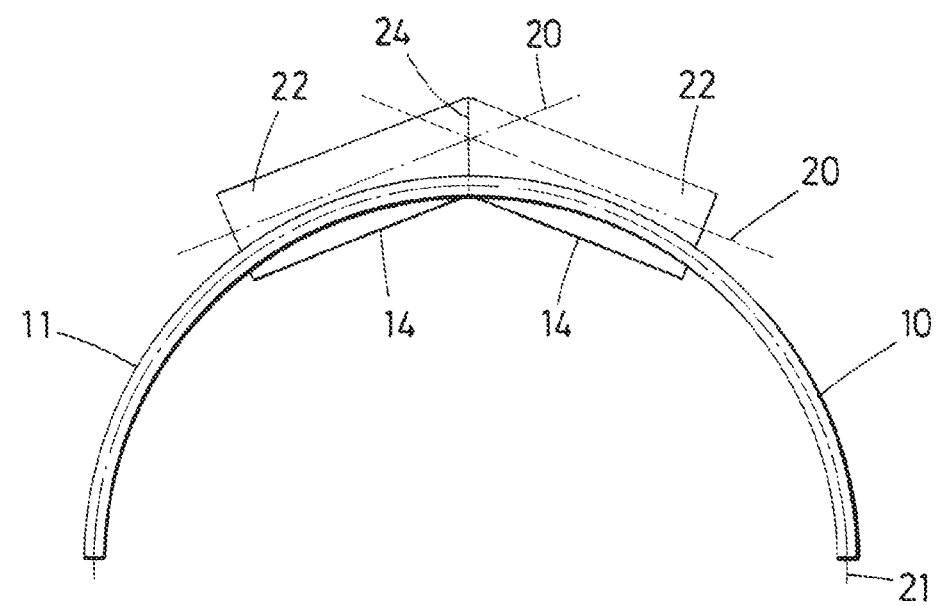
FIG. 7 shows a preferred embodiment of the invention, wherein the mid-plane of one of the parts of the frame is displaced, with respect to the mid-surface of the tower wall, outwards in a radial direction in order not to intersect with said mid-surface.

In accordance with a second criterion, as can be observed in FIG. 6, the mid-plane (20) of at least one of the parts (14) is tangential to the mid-surface (21) of the tower (15) wall (11). In this manner, the frame (13)-tower (15) joint is reinforced in the zone wherein the mid-plane (20) is tangential to the mid-surface (21) of the tower. This makes it possible to locate the most resistant zone of the joint in the orifice (12) zone where the greatest stresses are found.

In accordance with a third criterion (see FIG. 7), the mid-plane (20) of at least one of the parts (14) is displaced with respect to the mid-surface (21) of the tower (15), outwards in a radial direction, so as not to intersect with said mid-surface (21).

Figure 9A:
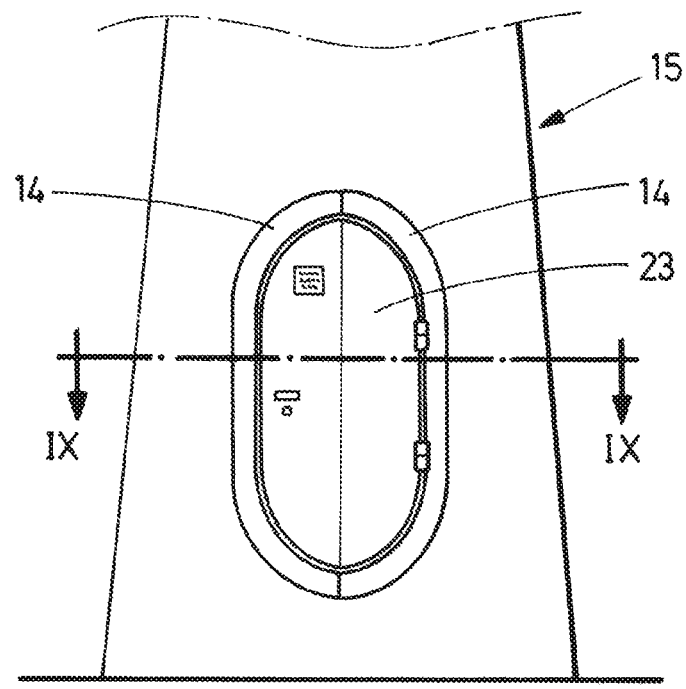
FIGS. 9A and 9B show elevational and plan views (section along plane IX-IX) of a tower that incorporates a frame and a door according to a preferred embodiment.
Figure 9B:
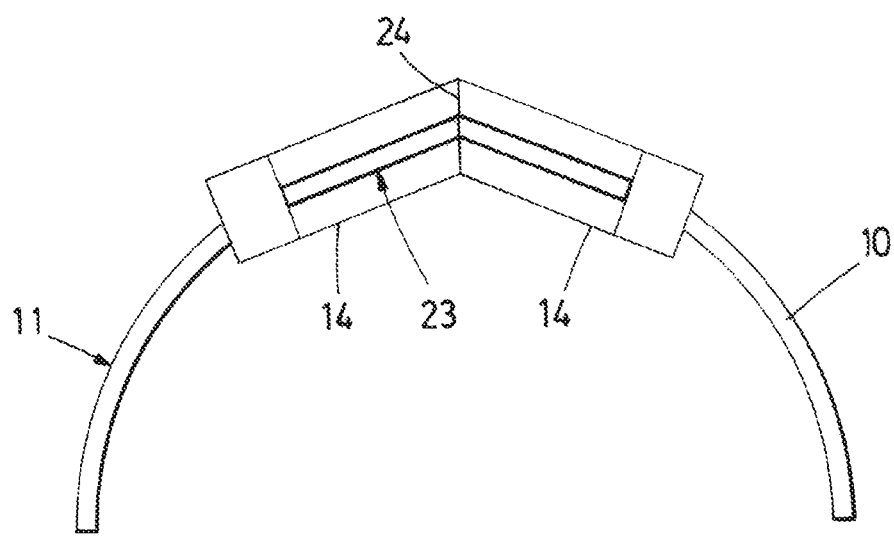

The tower (15) of the invention can additionally comprise, as shown in FIG. 9, a door (23), endowed with door thickness, and mounted on the frame (13) to seal the orifice (12) where, preferably, in a closed position, the door (23) thickness is fully contained in the frame (13) thickness.

The invention claimed is:

1. A curved cross-section wind turbine tower, comprising:
   a wall, comprising an orifice for accessing inside the tower, and an outer surface defined by generatrices, the orifice being limited by boundaries, and
   a reinforcing frame joined to the tower and disposed internally to the boundaries of the orifice wherein the reinforcing frame comprises at least two parts joined together,
wherein each of the parts has a mid-plane which is parallel to at least one generatrix of the tower and wherein the mid-planes of at least two adjacent parts form an angle other than 180° therebetween.

2. The wind turbine tower of claim 1, wherein at least one of the parts has, on one end, a joining surface for joining to a corresponding adjacent part, wherein the joining surface forms an angle other than 90° with the mid-plane of the corresponding adjacent part.

3. The wind turbine tower of claim 1, wherein at least one of the parts has at least one curved section.

4. The wind turbine tower of claim 3, wherein the at least one part having at least one curved section comprises a curved or bent prismatic element.

5. The wind turbine tower of claim 4, wherein the prismatic element has a hollow cross-section.

6. The wind turbine tower of claim 3, wherein the at least one part having at least one curved section is cut out from a flat element.

7. The wind turbine tower of claim 1, wherein the parts are joined together by means of a welded joint.

8. The wind turbine tower of claim 1, wherein the mid-plane of at least one of the parts is secant to a mid-surface of the tower wall.

9. The wind turbine tower of claim 8, wherein the mid-plane of one part of a pair of adjacent parts define a first intersection with the mid-plane of the other part of said pair of adjacent parts, wherein the first intersection is tangential to the mid-surface of the wall of the tower.

10. The wind turbine tower of claim 8, wherein each part also comprises a lateral surface whereby the part is joined to the tower wall, wherein the mid-plane of a part defines, with the lateral surface of the part, a second intersection tangential to the mid-surface of the wall of the tower.

11. The wind turbine tower of claim 1, wherein the mid-plane of at least one of the parts is tangential to a mid-surface of the wall of the tower.

12. The wind turbine tower of claim 1, wherein the mid-plane of at least one of the parts is displaced with respect to the mid-surface of the tower outwards in a radial direction so as not to intersect with said mid-surface.

13. The wind turbine tower of claim 1, wherein the parts consist of two parts, each one of which, in turn, comprises:

a middle section, and an upper section and a lower section that respectively extend, in order to be assembled above and below the middle section, towards the corresponding upper or lower section of an other one of the two parts.

14. The wind turbine tower of claim 13, wherein the two parts are symmetrical to one another with respect to a central axis of the orifice which is oriented along the direction of a generatrix.

15. The wind turbine tower of claim 13 wherein the upper and lower sections have a curved shape.

16. The wind turbine tower of claim 1, wherein each of the parts of the reinforcing frame are straight elements.

17. The wind turbine tower of claim 1, additionally comprising a door, endowed with a thickness, and mounted on the reinforcing frame to close the orifice, wherein the reinforcing frame has a thickness, and wherein, in a closed position, the thickness of the door is fully contained in the thickness of the reinforcing frame.

18. A wind turbine comprising the tower described in claim 1.

\* \* \* \* \*